Figure 1:
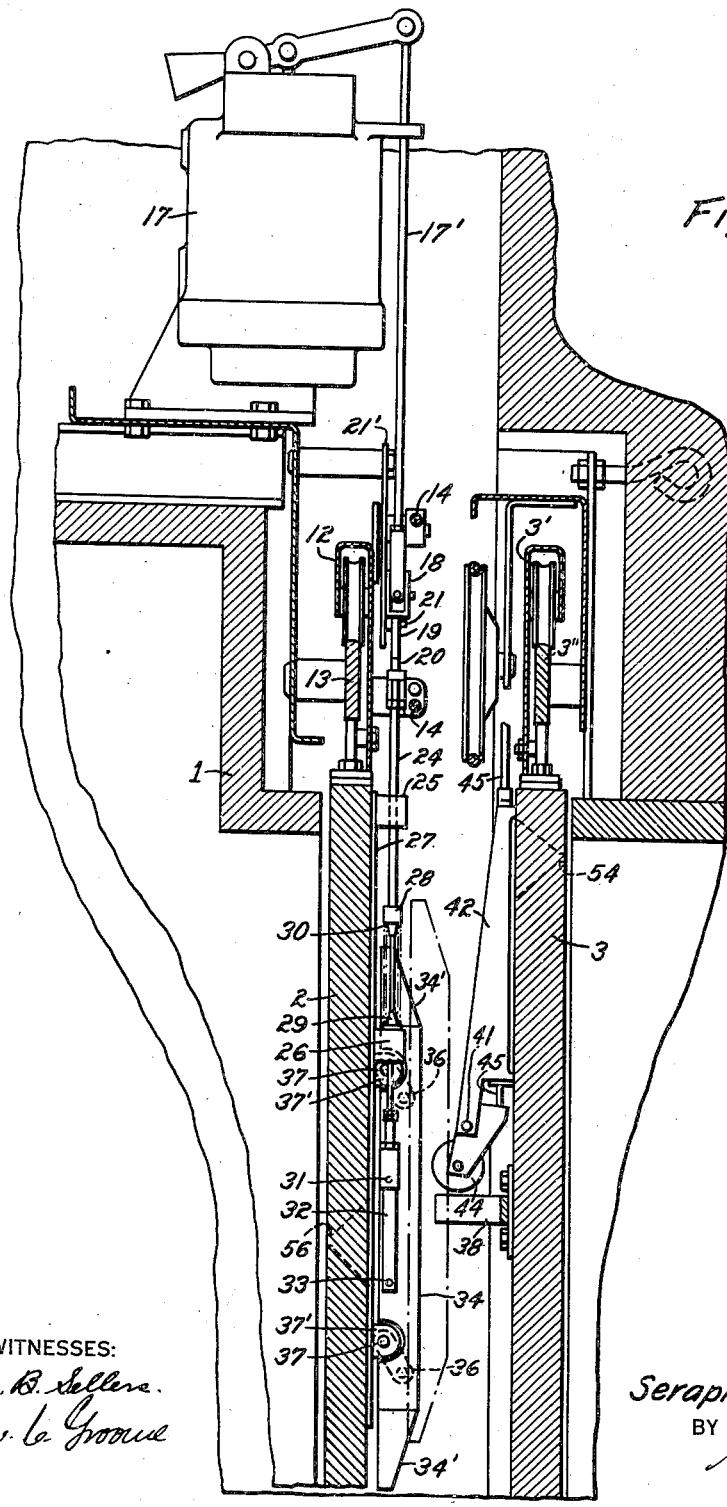

Sept. 6, 1949.

S. KRUGER 2,481,124

DOOR-OPERATING MECHANISM FOR
LIFT DOORS AND THE LIKE

Filed Sept. 8, 1945

7 Sheets-Sheet 1

WITNESSES:
Wm. B. Sellers.
New La Groove

INVENTOR
Seraphim Kruger.
BY
ATTORNEY

Sept. 6, 1949.  S. KRUGER  2,481,124
DOOR-OPERATING MECHANISM FOR
LIFT DOORS AND THE LIKE
Filed Sept. 8, 1945  7 Sheets-Sheet 2

WITNESSES:
Wm. B. Sellers
Nw. L. Groome

INVENTOR
Seraphim Kruger.
BY
ATTORNEY

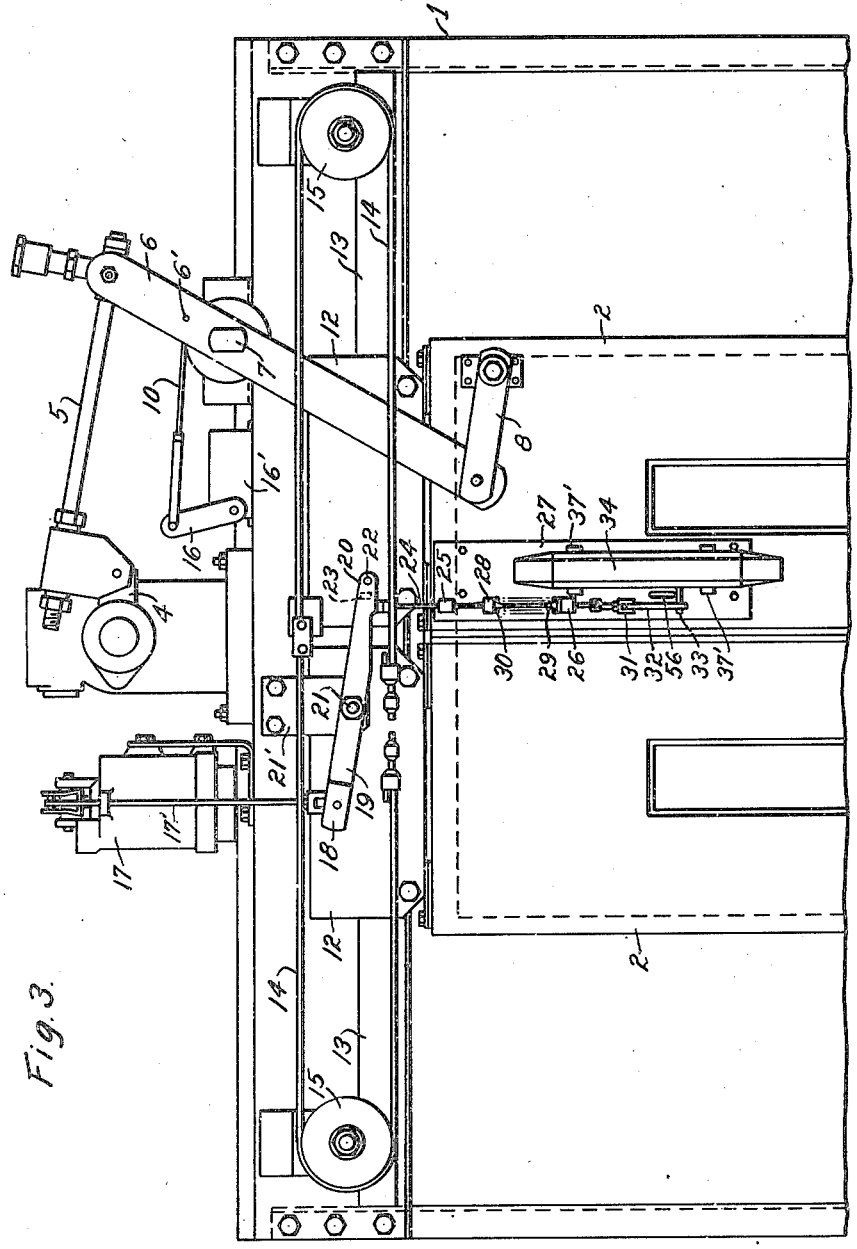

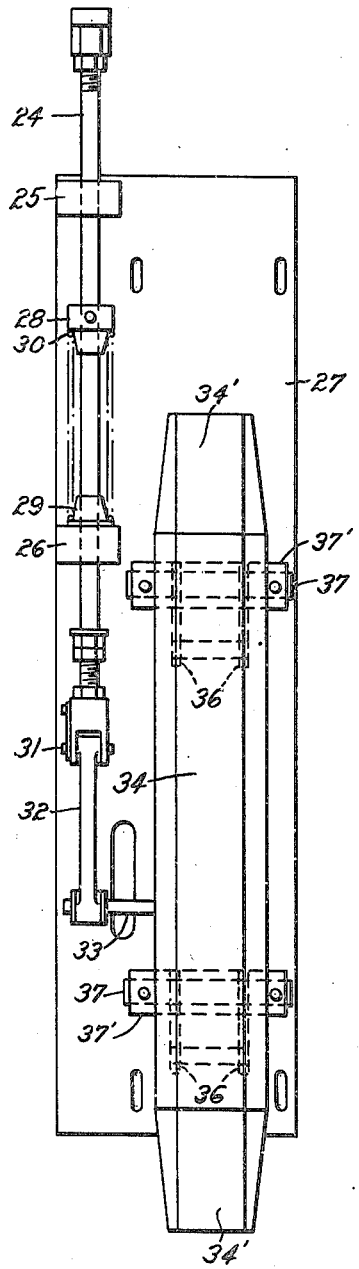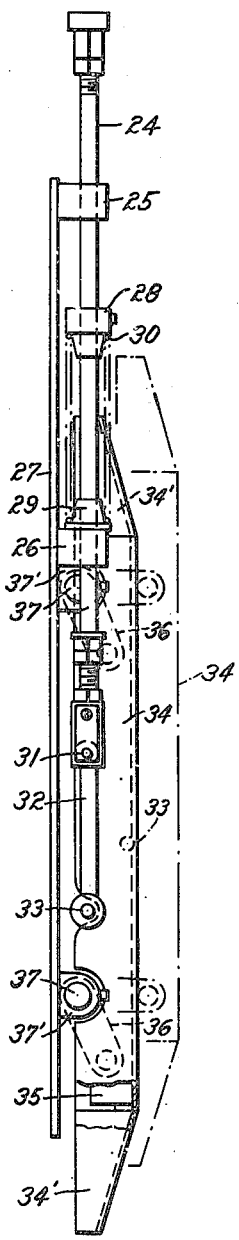

Sept. 6, 1949.   S. KRUGER   2,481,124
DOOR-OPERATING MECHANISM FOR
LIFT DOORS AND THE LIKE
Filed Sept. 8, 1945   7 Sheets-Sheet 5

WITNESSES:
Wm. B. Sellers.
New. L. Groome

INVENTOR
Seraphim Kruger.
BY
ATTORNEY

Sept. 6, 1949.  S. KRUGER  2,481,124
DOOR-OPERATING MECHANISM FOR
LIFT DOORS AND THE LIKE
Filed Sept. 8, 1945  7 Sheets-Sheet 6
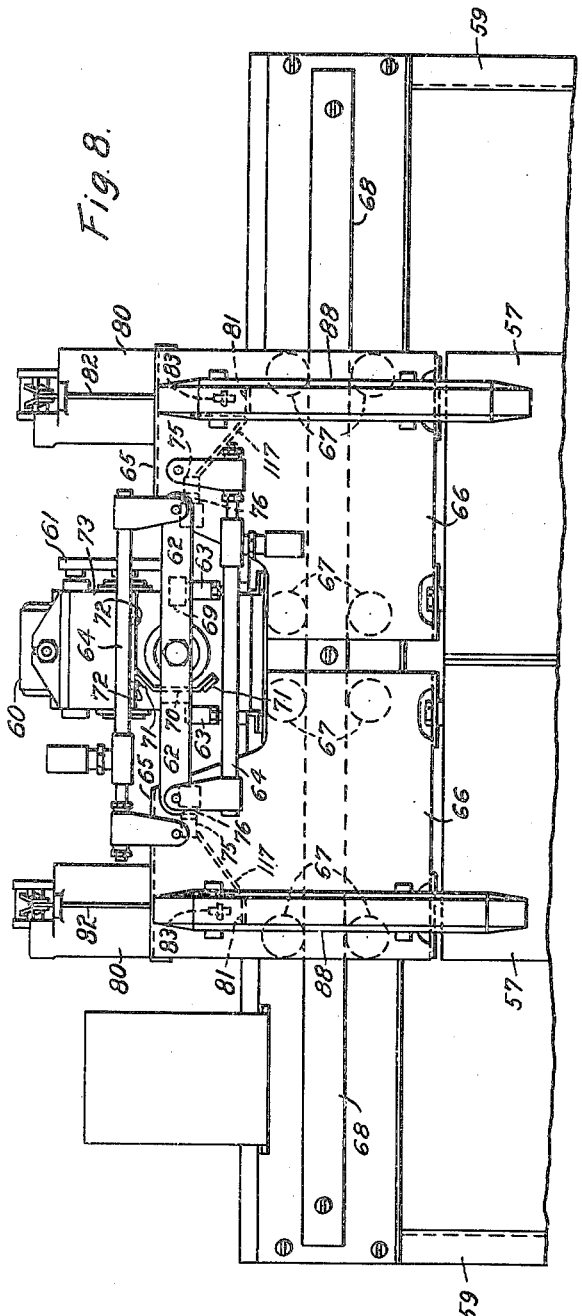
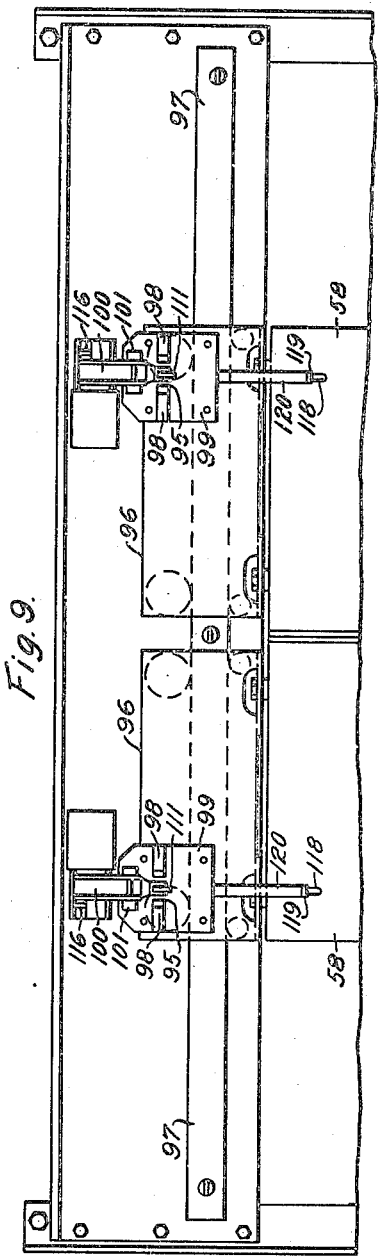
WITNESSES:
INVENTOR
Seraphim Kruger.
BY
ATTORNEY Sept. 6, 1949.　　　　　　　　S. KRUGER　　　　　　　　2,481,124
DOOR-OPERATING MECHANISM FOR
LIFT DOORS AND THE LIKE
Filed Sept. 8, 1945　　　　　　　　　　　　　　　　　7 Sheets-Sheet 7

WITNESSES:
Wm. B. Sellers.
　　　　　　　　　　　　　　　INVENTOR
　　　　　　　　　　　　　Seraphim Kruger.
　　　　　　　　　　　BY
　　　　　　　　　　　　　　　ATTORNEY Patented Sept. 6, 1949

2,481,124

UNITED STATES PATENT OFFICE 2,481,124

DOOR-OPERATING MECHANISM FOR LIFT DOORS AND THE LIKE

Seraphim Kruger, Northampton, England, assignor to The Express Lift Company Limited, London, England, a British company Application September 8, 1945, Serial No. 615,202
In Great Britain September 13, 1944

5 Claims. (Cl. 187—52)

This invention relates to lift systems and the like of the kind wherein a lift car having a door can be driven to any one of a plurality of landing levels each of which has also a door and means is provided whereby the lift car door and a corresponding landing door can be interconnected or coupled to permit simultaneous operation thereof when the car reaches a landing level. It will be understood that the term "door" is intended to include any constructional form of single or multiple panel door, gate or the like, also a door of the centre-opening type the members of which are adapted to be moved simultaneously.

It has been found that, in systems of the kind above referred to, the operation thereof may be unsatisfactory, or troubles may arise, on account of the amount of back-lash in the means by which a lift car door and a landing door are interconnected or coupled for simultaneous operation.

The chief object of the present invention is to eliminate the above-mentioned drawback and to ensure a more efficient coupling of the said doors.

According to the present invention, there is provided at least one set of door-coupling means comprising a member which is so constructed and arranged as to be capable of being thrust forward mechanically from the door of the lift car into wedge-like engagement with a correspondingly grooved block or the like on a landing door when the car reaches the desired landing level, the said member being adapted to be retained in the retracted position by power operated means carried by the lift car.

Figure 4:
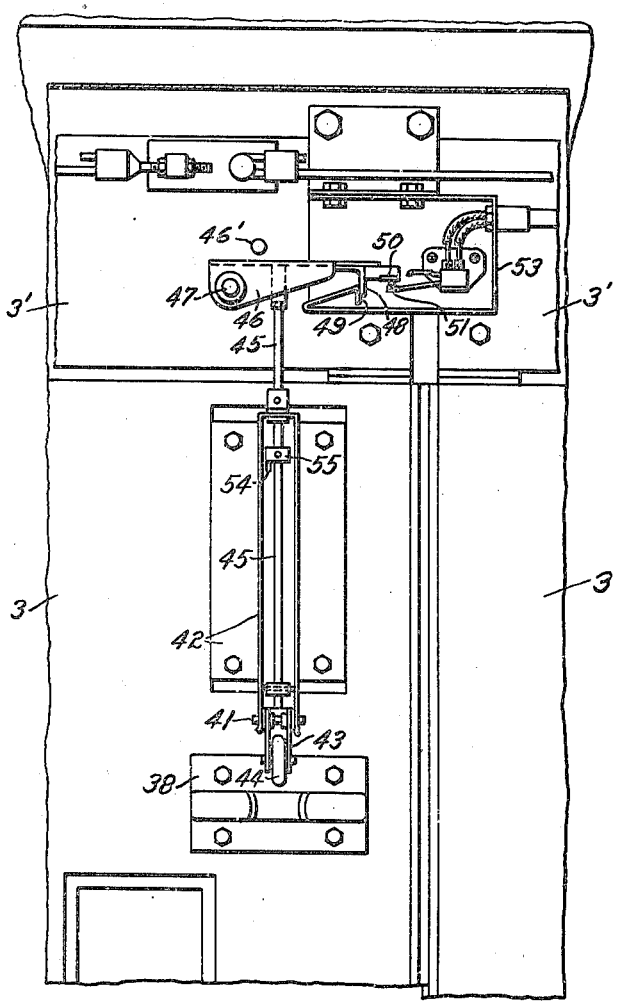
Figure 2:
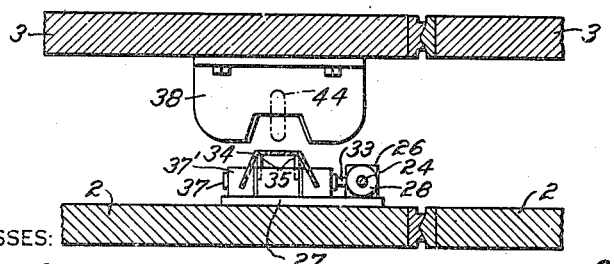
Figure 7:
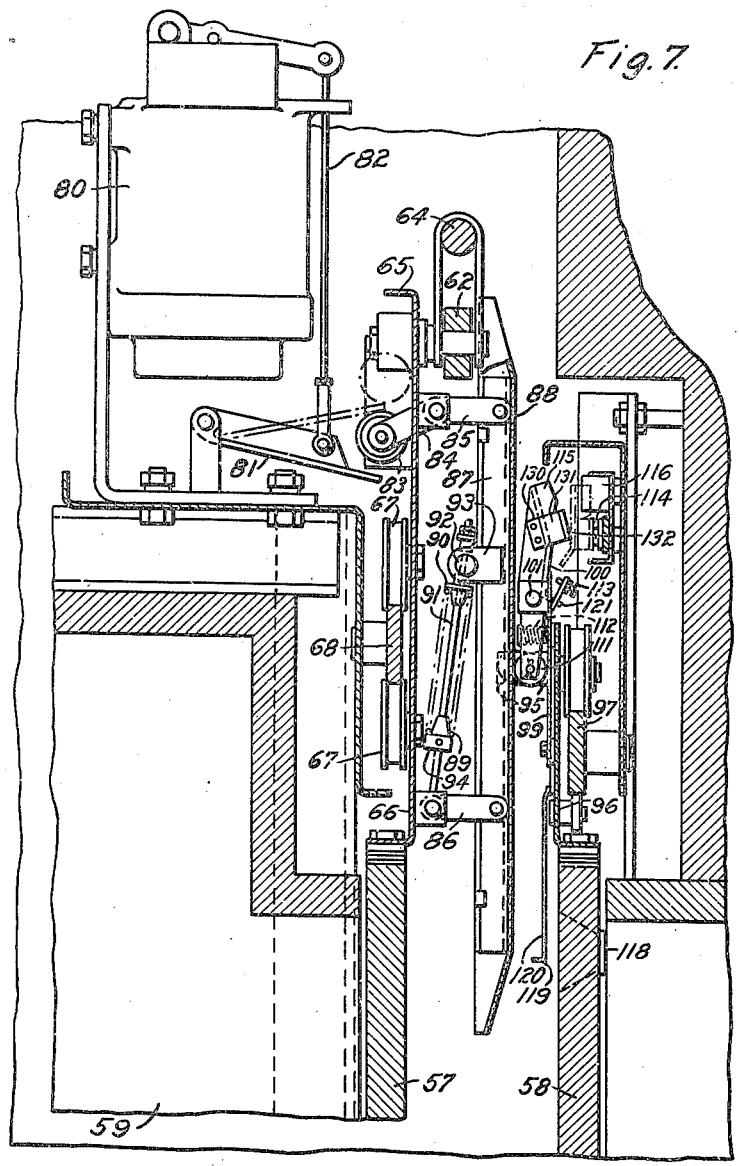
Figure 10:
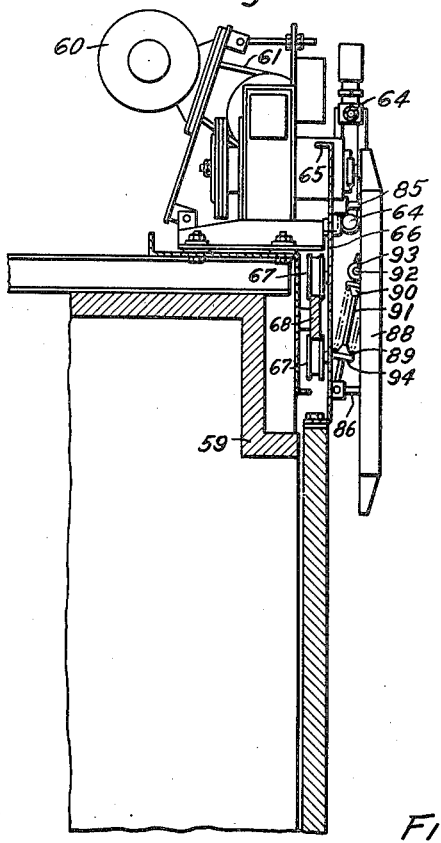
Figure 12:
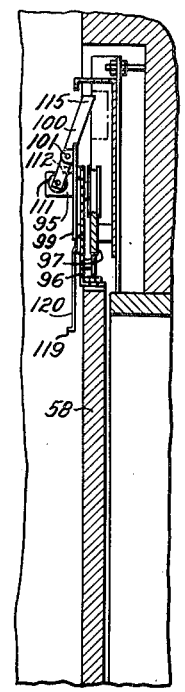
Figure 11:
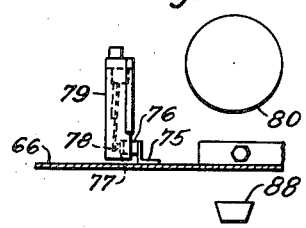
Figure 13:
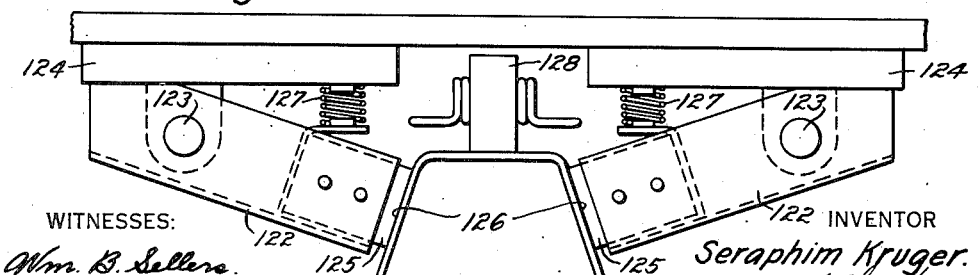

The invention will now be described, by way of example, with reference to the accompanying drawings, in which:

Figure 1 is a fragmentary vertical cross-sectional view showing the invention applied to a lift system in which the lift car, and each of the landings, is provided with a door of the centre-opening type the panels of which are slidable and interconnected so as to be movable simultaneously, Figure 2 is a fragmentary sectional plan view, Figure 3 is a fragmentary front elevation, on a smaller scale, showing a general arrangement of the lift car door and relative parts, Figure 4 is a view similar to Figure 3, but on an enlarged scale, showing a general arrangement of the landing door and relative parts as seen from the lift car, Figures 5 and 6 are views taken at right angles to one another, also on an enlarged scale, showing in detail the manner in which the coupling member carried by the lift car is mounted, Figures 7, 8 and 9 are similar views to Figures 1, 3 and 4, respectively, but showing a modification, Figure 10 is a fragmentary vertical sectional view taken at right angles to Figure 8, Figure 11 is a fragmentary diagrammatic plan view corresponding to the upper right hand portion of Figure 8, Figure 12 is a fragmentary vertical sectional view taken at right angles to Figure 9, and Figure 13 is a fragmentary plan view showing a modified form of grooved coupling block for the landing door.

Referring first more particularly to Figures 1 to 6 of the drawings, the lift car 1, and each of the landings, is provided with a door comprising a pair of centre-opening, interconnected sliding door panels 2 and 3, respectively, which move simultaneously. The lift car has arranged thereon power operating means for actuating the doors, the said means being of the crank, link and lever type, as shown in Figure 3, and comprising a reversible electric motor (not shown) which is adapted by means of a belt drive and reduction gear to rotate a crank 4 clockwise or anticlockwise through an angle of 180° between fixed stops. The crank 4 is coupled by means of a link rod 5 to a lever 6 pivoted at 7 upon the lift car frame and in turn coupled by a link 8 to one of the pair of door panels 2 on the lift car. The coupling between the link rod 5 and the lever 6 is preferably of the emergency ball-catch release type. The door panels 2 are adapted to hang and slide by means of carriages 12 upon an overhead track 13 and are guided as by means of spigots or the like which engage with a second track let into the floor on the lift car. When the said motor is energised in the appropriate direction it rotates the crank 4, say anti-clockwise, and imparts, through the said link rod 5 and lever 6, longitudinal motion to the lift car door panels 2, which are interconnected by belts 14 passing round guide pulleys 15, in known manner. The dimensions of the crank, links and lever are so determined that the harmonic motion imparted to the door panels 2 reaches zero velocity as the said panels arrive at the ends of their travel, and accelerates to maximum velocity when the panels occupy an intermediate position. Thus, the door panels may travel at a very high maximum velocity, and the total time required to open or close them may be relatively short, but the inertia and momentum of the panels is fully controlled by virtue of the fact that the acceleration and deceleration follows an approximately harmonic curve in respect to the distance travelled by each door panel. Pivotally connected at 6' to the lever 6 is a rod 10 which in turn is connected to the operating arm 16 of electric switch mechanism within a casing 16'. The position on the lever 6 at which the rod 10 is connected and the length of the operating arm 16 are so chosen that the switch is opened immediately the door panels begin to open, thus preventing accidental actuation of the means for effecting the coupling of the lift car and landing doors and/or the driving of the lift car away from that landing level with the doors open.

Also mounted on the lift car is an electro-magnetic device, such as a solenoid 17, Figures 1 and 3, which is coupled by means of a rod 17' to one end 18 of a thrust lever 19 and which, when it is energised, causes the other end 20 of the said thrust lever to be depressed, and when it is de-energised permits the last-named end of the thrust lever to rise. The thrust lever 19 is pivoted at 21 upon a bracket 21' secured to the car door frame and the end 20 thereof is provided with a lock pin 22 which, when the thrust lever is depressed, engages behind a lock block 23 fixed to the carriage of one of the car door panels, the arrangement being such that through the aforesaid door coupling belts, both car door panels 2 are locked in the closed position. At the same time, when the thrust lever 19 is depressed, it acts on a vertical thrust rod 24 passing through guide bearings 25, 26, Figures 1, 3, 5 and 6, on a base plate 27 secured to one of the car door panels 3, the said thrust rod having attached thereto a bush 28 between which and a bush 29 resting on the guide bearing 26 a helical spring 30 is interposed. The lower end of the thrust rod 24 is pivotally connected at 31 to a swinging link 32 coupled to a transverse rod 33 fixed with respect to an upright wedge-block 34 which may be of any appropriate form in cross-section to give a wedge action. The said wedge-block, in the example shown, comprises a metallic outer covering portion of channel formation in cross-section with inclined side flanges, the said portion having secured therein a link coupling bar 35, Figures 2 and 6, to which the transverse rod 33 is attached in a rigid manner. Parallel links 36 are pivotally connected to the bar 35 and to pins 37 fixed on bearings 37' secured to the base plate 27 so that the wedge block is supported in such a manner that when the thrust lever 19 is depressed it acts on the thrust rod 24 and compresses the spring 30 whereby the wedge-block 34 is caused to swing inwards towards the car door panels, to occupy the position shown in full lines in Figures 1 and 6, and when the solenoid 17 is de-energised the spring 30 acts upwardly upon the bush 28 attached to the thrust rod 24 whereby the wedge-block 34 is raised through the intermediary of the link 32 and caused to swing outwards by means of the said links 36 towards the landing door panels 3 so as to occupy the position shown in dotted lines in Figures 1 and 6 and engage with a grooved block 38 fixed rigidly to a corresponding landing door panel, the groove in the said block being of such form in cross-section as to permit the desired wedge action to be obtained. The angle between the inclined faces of the wedge-block 34 should be slightly greater than that between the corresponding faces of the grooved block 38. As in the case of the car door panels 2, the landing door panels 3 are adapted to hang and slide by means of carriages 3' upon an overhead track 3" and are also coupled together so as to move simultaneously, by means of belts passing over guide pulleys. The wedge-block 34 is adapted to fit snugly into the groove in the grooved block 38 so that the two sets of door panels are coupled together without any play between them. Any movement imparted to the car door panels is exactly followed by the landing door panels and the inertia or momentum of the latter cannot cause bumping or slamming regardless of the speed imparted to the car door panels by the door power operating means. The amount by which the wedge-block is withdrawn from the grooved block when the solenoid is energised, is arranged to be sufficient to give adequate clearance between it and any part of the equipment in the lift well including the grooved blocks fitted to the doors of landings which are being passed by the lift car when it is in motion. The wedge-block is of sufficient vertical height so that it can engage efficiently with the grooved block as long as the lift car stops within reasonable predetermined limits in relation to the landing level. In a lift system in which the lift car can be driven slowly to exact landing level whilst the doors are opening or open, the said grooved block can be made either of special material or have roller faces so that the wedge-block can slide through it easily.

Pivotally mounted at 41 on a bracket 42, Figures 1 and 4, secured to the landing door panel provided with the grooved block 38 is a bifurcated lever 43 having at the free end thereof a roller 44 which is arranged in line with the groove in the grooved block 38, so that when the wedge-block 34 engages with the said grooved block it also engages with the roller 44, the upper and lower portions 34' of the contacting face of the wedge-block being bevelled, as shown in Figures 1 and 6, to facilitate engagement with the roller 44, thereby causing the lever 43 to rock on its pivot and thrust upwards by means of the upper part thereof a guided lift-rod 45, the upper end of which lift-rod engages with a beak-ended lock lever 46 pivoted at 47 upon the landing door carriage. When the wedge-block 34 is withdrawn by energisation of the solenoid 16, the lift-rod 45 is lowered whereby the beak end 48 of the lock lever is permitted to engage with a lock anvil 49 fixed to the landing door frame, so that through the respective belt coupling, both of the landing door panels are locked in the closed position. The lock lever 46 carries an electric contact bridge piece 50 which, when the beak has engaged with the anvil, as shown in Figure 4, closes a pair of electric contacts at 51 to signal that door closing and locking movements have been completed and that the lift car may be driven away from that particular landing level, the said contacts being carried on the door frame. When the wedge-block 34 is permitted to engage with the grooved-block 38, by de-energisation of the solenoid 16 after the lift has come to rest at a landing level, the lever 43 raises the lift-rod 45 and hence the lock lever 46, so that the said electric contacts are opened at once, thereby preventing the lift car from being driven away from that floor, and further raising of the lock lever 46 then brings the beak 48 clear of the anvil 49, the upward movement of the said lever being limited by a stop 46'. The opening of the said electric contacts may also be employed to initiate energisation of the door power operating means to cause the opening of the two sets of door panels.

It will be appreciated that both sets of door panels are mechanically locked when the solenoid 17 is energised; and the electric contacts 51 associated with the landing doors are not made until the lock lever 46 has made some further movement after that necessary to engage its beak 48 with the lock anvil 49. Thus, it is ensured that the landing doors are locked safely before the lift car can be driven away. Similarly, the contacts 51 are broken before the lock-lever 46 rises sufficiently to permit the beak 48 to clear the anvil 49, thus ensuring that the lift car is prevented from being driven away with the lift car door panels and the landing door panels interconnected. This arrangement has the further advantage that the bridge piece 50 is carried out of the lock box 53 as soon as the landing doors commence to move, thus ensuring that the electric circuit completed by the said bridge piece cannot be remade unless the doors are in the completely closed position. Another advantage is that, as the making of the said electric circuit depends upon the lowering of the lock lever 46 which itself depends upon the withdrawal of the wedge-block 34 from the grooved block 38, the lift car cannot be started up unless the lift car doors are uncoupled from the landing doors. A still further advantage is that the lock lever is lowered into the locking position after the doors are closed; thus, avoiding the noise normally associated with the striking of a lock beak upon a lock anvil.

In the event of any part of the system failing to function properly, access may be gained to the lift shaft by unlocking the landing doors. This can be effected by inserting a key in a keyhole 54, Figures 1 and 4, provided in the landing door panel to which the grooved block 38 is secured, the said keyhole being positioned so that the end of the key can engage with a part of the aforesaid lift-rod 45, such as a collar 55 secured thereto, to lever the lift-rod upwards and thus raise the lock lever 46 as previously described. The landing door panels can now be opened quite easily by hand, as they slide freely on their overhead tracks. In this way, for example, access may be had to all the lift car door mechanism.

If the lift car is standing at a landing level, with the said wedge-block 34 in a position to couple the car door to a landing door, both sets of door panels will be unlocked, and if the door power operating means fails to open them (or has closed them, and the control has not been put into a condition to drive the lift car to another landing level), then the two sets of door panels can be opened from the landing or from the lift car by exerting just sufficient force to trip the aforesaid emergency ball catch release, thereafter the two sets of door panels slide open freely on their tracks. If this should prove to be impossible because one set of doors has jammed, for example because of obstruction in the bottom guide track, the lift car door panels may be uncoupled from the landing door panels by means of a key which may be inserted through a keyhole 56, Figures 1 and 3, provided in the car door panel corresponding to that landing door panel to which the grooved block 38 is secured, the said keyhole being positioned so that the end of the key may engage with a part, such as the transverse rod 33 associated with the wedge-block 34, whereby downward movement thereof causes compression of the spring 30 so that the wedge-block 34 is disengaged from the grooved block 38.

It will be appreciated that an appropriate torque motor may be substituted for the aforesaid electro-magnetic device, or, alternatively, the function of the said device may be performed by means the actuation of which is caused by the initial part of the motion of the door power operating means, the electric control and aforesaid electric contacts being modified accordingly.

In the modification shown in Figures 7 to 12, in which the lift car and each of the landings is provided with a door comprising a pair of centre-opening sliding door panels 57 and 58, respectively, which move simultaneously, the lift car 59 has arranged thereon power operating means for actuating the car door panels, the said means being of the crank and link type and comprising a reversible electric motor 60, Figures 8 and 10, which is adapted by means of a belt drive 61 and reduction gear to rotate a pair of diametrically opposed cranks 62 clockwise or anti-clockwise through an angle of 180° between fixed stops 63 which are preferably provided with buffers. Each of the said cranks is coupled by means of a link rod 64 to an extended portion 65 of the corresponding door panel carriage 66. Each door panel carriage is provided with rollers 67 which co-operate with a fixed overhead track 68. The door panels are guided at their lower ends by means of spigot or the like which engage with a suitable track let into the floor of the lift car. The links 64 are preferably of the emergency release type employing a spring-loaded catch (preferably a ball-catch). When the motor 60 is energised in the appropriate direction it rotates the cranks 62 and imparts longitudinal motion through the links 64 to the lift car door panels. The dimensions of the cranks and links are so determined that the harmonic motion imparted to the said door panels reaches zero velocity as the said panels arrive at the ends of their travel, and accelerates to maximum velocity when the said panels occupy an intermediate position. Thus the door panels may travel at very high maximum velocity and the total time required to open or close them may be relatively short, but the inertia and momentum of the panels is fully controlled by virtue of the fact that the acceleration and deceleration follows a harmonic curve in respect to the distance travelled by each door panel. Fixed to one of the cranks is a block 69, Figure 8, which engages with the stops 63 in such a manner that when the car door panels are in the fully closed position or in the fully opened position, the axis of the pivot connecting each crank to the respective link, the axis of the crank, and the axis of the pivot connection between the said link and the respective door panel carriage, are co-planar so that the door panels are held in the closed or open position. One of the cranks carries a two-armed bracket 70 having cam pieces 71 attached one to each arm and adapted to co-operate with the outwardly projecting roller ended arms 72 of electric switches arranged within a switch box 73 carried by the lift car, so that when the cranks are in the door fully-closed or fully-opened positions, one of the said cam pieces engages with the appropriate roller and operates the corresponding switch so as to open contacts in an electric circuit, thus, for example, switching off the reversible electric motor. The carriage 66 of each of the lift car door panels 57 has secured thereto a bracket 75, Figures 8 and 11, carrying an insulating base 76 on which a contact bridge-piece 77, Figure 11, is arranged so that when each door panel is in the fully-closed position, as shown in Figure 8, the said bridge-piece engages, as shown in Figure 11, with a pair of electric contacts at 78 to complete an electric circuit to signal that the lift car door is completely closed, the said contacts being arranged on a suitable insulating bracket 79, Figure 11, secured to the lift car.

Mounted also on the lift car is an electromagnetic device, such as a solenoid 80 (one for each door panel) which, when energised, raises, as shown more particularly in Figure 7, the free end of a pivoted lever 81 by means of a rod 82 so as to thrust upon a roller 83 on one arm 84 of a bell-crank, the other arm 85 of which, together with a pivoted parallel link 86, supports a link coupling bar 87 over which is fixed a cover 88 shaped to act as a wedge-block substantially as in the manner above described with reference to the wedge-block in the first embodiment. When the solenoid is de-energised and hence the lever 81 is in its lowest position, indicated by full lines in Figure 7, the link coupling bar 87 and hence the wedge-block 88 is thrust outwards away from the lift car, as indicated by full lines in Figures 7 and 10, by means of a helical spring 89 which exerts a thrust at one end upon the link coupling bar 87 through the intervention of a bush 90 freely mounted on a guide rod 91 secured to the link 86 and passing through a pin 92 carried by a bearing 93 secured to the coupling bar, the thrust of the spring at the other end thereof being exerted upon a bush 94 fixed to the guide rod 91. The said bell-crank, the parallel link 86, and the spring guide rod assembly, are carried by the carriage 66 of the particular car door panel.

Assuming that the car is standing within predetermined limits with respect to a floor level, each wedge-block 88 engages with a grooved-block 95 (Figures 7 and 9) which is rigidly fixed to the carriage 96 of a corresponding door panel 58 of the landing door, each landing door panel carriage being provided with rollers which, as shown, co-operate with a fixed overhead track 97. The grooved block, in the example shown, comprises spaced wing elements 98 carried by a plate 99 secured to the respective carriage, the wedge-block 88 engaging in the groove afforded by the said wing elements in such a manner that the lift car door panels and the landing door panels are coupled together without any play between them. Any movement imparted to the car door panels is exactly followed by the corresponding landing door panels and the inertia or momentum of the latter cannot cause bumping or slamming, regardless of the speed imparted to the car door panels by the door power operating means. The movement of each car door panel away from the fully closed position causes the respective roller carrying arm 84 of the said bell-crank to be moved out of alignment with the lever 81 so that, should the respective solenoid accidentally become energised, the said lever cannot thrust upon the said arm 84.

The grooved block 95 is rigidly fixed, as aforesaid, to the carriage of the said corresponding landing door panel 58 and between the wing elements 98 of the said grooved block there is arranged a lever 100 which is pivoted at 101 on the respective plate 99, Figures 7 and 9, and provided at its lower end with a roller 111, the said lever being held in the forward position by means of a spring 112 and being adjustably positioned as by means of a screw 113. The lever 100 is also provided with a bracket 130, Figure 7, which carries an insulating block 131 having mounted thereon a contact bridge piece 132, which when the roller end of the lever is in the forward position, indicated by dotted lines, Figure 7, engages with a pair of electric contacts 114 carried by a suitably insulating part on the landing door frame. An extension 115 of the said lever also engages behind a stop 116 rigidly fixed to the landing door frame so as to act as a lock for the said landing door when the latter is in the fully closed position.

Assuming the lift car is standing at a floor level with the door panels open and it is desired to drive the lift car to another floor level. The necessary starting signal is given to the lift system in one of the known ways, for example, by depressing a button associated with the floor to which the car is to be driven and fitted inside the car. This action results in energisation of the reversible motor 60 so as to rotate the cranks 62 in the appropriate direction to cause the door panels to close and when this has been completed, the aforesaid contacts controlled by the appropriate cam piece 71 are opened to switch off the reversible motor and the closing of the aforesaid contacts at 78, Figure 11, adapted to permit the signalling of the door-closed position, completes a circuit to the solenoid 80, (one for each door panel), which is thus energized and lifts the free end of the lever 81 associated therewith. This lever rotates the bell crank operable thereby, thus compressing the spring 89 connected with the respective wedge-block 88 and withdrawing the wedge-block from the relatively fixed grooved block 95 with which it co-operates, thereby uncoupling the car door from the landing door. At the same time, the roller-ended lever 100 arranged between the wings of the respective grooved block 95 is permitted to rotate, and its extension 115 engages beyond the stop 116 fixed to the landing door frame, thus locking the landing door closed and signalling the completion of the door closing and locking operation, by completing an electric circuit at the contacts 114.

As a further precautionary measure, the lever 81 actuated by the respective solenoid, when in its raised position, takes up a position beyond a lock anvil 117, Figure 8, which is carried on the carriage of the appropriate lift car door panel. The amount by which the wedge-block 88 is withdrawn from the grooved block 95 when the solenoid is energised, is arranged to be sufficient to give adequate clearance between it and any part of the equipment in the lift well including the grooved blocks fitted to the carriages of the door panels of the landing doors which are being passed by the lift car when it is in motion. Each wedge-block is of sufficient vertical height so that it can engage efficiently with the respective grooved block so long as the lift car stops within reasonable predetermined limits in relation to the landing level.

When the contacts 114, Figure 7, have been closed, the control system is able to drive the lift car to the desired floor level and when the car has been brought to rest, the control system de-energises the solenoids causing the respective levers 100 to occupy the position whereby the car door is unlocked, and each wedge-block is permitted to be thrust forward by the spring associated therewith into engagement with the grooved block provided on the particular landing door panel carriage. Each wedge-block also engages with the respective roller ended lever 100 so that the extension 115 of the said lever is retracted from the stop 116 with which it co-operates, thus unlocking the landing door and signalling this fact to the control system by opening the aforesaid contacts 114. The reversible motor 60 on the lift car is now energised so as to rotate the cranks 62 in the appropriate direction to open the car door panels and hence through the aforesaid coupling means, also the landing door panels, the motor being switched off when the opening operation has been completed, by virtue of one of the cam pieces 71 engaging with an electric contact assembly in a manner similar to that previously described with reference to switching off the motor when the doors are in the fully-closed position. It will be appreciated that immediately the contacts in the circuit for signalling the fully-closed door position, and/or the contacts in the circuit for signalling the locking position when the doors are fully closed, are opened, the control system is prevented from causing the lift car to move.

Should it become necessary to open the landing door when a car is not present at that landing, as for example, for maintenance purposes, then an authorised person can insert a particular form of key in a keyhole 118, Figures 7 and 9, provided in each of the landing door panels, the said key engaging, for instance, with the end 119 of a push rod 120 carried by the respective plate 99 so that when the handle end of the key is depressed, the said push rod is raised and the upper end thereof thrust against a hook-like part 121 on the pivoted lever 100 to cause the said lever to be actuated so as to break the electric contacts 114 controlled thereby and also cause the extension 115 of the said lever to disengage from the stop 116. That particular door panel is now unlocked and can be freely slid to the open position.

It will be understood that the crank and link type of operating mechanism above may be adapted to be applied to a car door comprising a single panel for coupling with a corresponding landing door panel. It will also be understood that whilst the crank and link type of operating mechanism above described is shown applied to a door of the centre-opening type wherein a separate set of solenoid wedge-block coupling parts is provided for each door panel, so that each door panel is separately controlled and locked, one set of coupling parts may be provided, and reliance made upon some form of door panel interconnecting means. It will also be understood that the means provided on the lift car for the simultaneous operation of the doors may be suitable for manual operation.

A modified form of grooved block is shown in Figure 13, wherein the parts thereof against which the wedge-block thrusts comprise normally inclined elements 122 which are pivotally mounted at 123 on base plates 124 secured to the landing door, the said elements having preferably renewable insertions 125 affording working faces 126 and being each retained in normal position by means of a spring 127, the arrangement being such that the wedge-block can re-engage readily with the grooved block should they become out of line with each other when the wedge-block is thrust forward.

With such an arrangement, if for any reason the projected wedge-block is not in line between the appropriate pair of pivoted elements of the grooved block, for example, by reason of the car door having been opened for maintenance adjustments whilst the landing door has been left closed, the open door may be moved towards its closed position and when the wedge-block engages with the first met pivoted element of the grooved block the said element is moved about its pivot 123 and depressed against the action of its spring 127 and the wedge-block is thus able to slide over it, the said element slipping into position behind the front of the wedge-block as soon as the latter is moved far enough. The position of the pivots of the said elements in relation to the working faces 126 thereof is arranged so that the said elements cannot inadvertently rotate out of line with the wedge-block under the influence of normal working thrusts.

When an element of the grooved block is depressed, it can act on a roller 128 carried by a pivoted lever similar, for instance, to the lever 113, Figure 7, whereby electric contacts controlled thereby are opened to ensure that the lift car cannot be started up whilst re-arrangement of the wedge-block with the grooved block is taking place.

The working faces of the said elements may be finished in various ways. For example, they may be provided with rollers to permit the wedge-block to slide readily between them should it be desired to level the lift car whilst the doors are opening. The ends of the wedge-block would be tapered at the front thereof as in the manner illustrated with reference to the above described embodiments, so that should the lift car pass a landing with the door thereof very slightly open, the wedge-block would be able to depress the appropriate pivoted element of the grooved block and pass by without inflicting damage.

What I claim is:

1. In a lift system, a lift car for serving a plurality of landing levels, a door for the car, means mounting the car door for movement relative to the car between an open position and a closed position, a landing door, means mounting the landing door at a landing level for movement from an open position to a closed position, releasable coupling mechanism for coupling the landing door to the car door for movement therewith, said coupling mechanism comprising a coupling element associated with the landing door, a coupling member for engaging the coupling element and means mounting the coupling member on said car for movement from a retracted position to an extended position engaging the coupling element when the car door is adjacent said landing door, locking means for locking the landing door in closed position, and an operating mechanism having an operating member disposed in the path of the coupling member when the coupling member is in the extended position for unlocking said locking means.

2. A lift system as claimed in claim 1 in combination with electric signalling means responsive to the condition of the locking means.

3. In a lift system, a lift car for serving a plurality of landing levels, a door for the car, means mounting the car door for movement relative to the car between an open position and a closed position, a landing door, means mounting the landing door at a landing level for movement from an open position to a closed position, releasable coupling mechanism for coupling the landing door to the car door for movement therewith, said coupling mechanism comprising a coupling element associated with the landing door, a coupling member for engaging the coupling element and means mounting the coupling member on said car for movement from a retracted position to an extended position engaging the coupling element when the car door is adjacent said landing door, said coupling element and the coupling member having coacting male and female parts, said female part comprising a pair of movable spaced bodies for receiving the male part therebetween, and spring means for urging the bodies into firm engagement with the male part when the male part is positioned therebetween.

4. In a lift system, a lift car for serving a plurality of landing levels, a door for the car, means mounting the car door for movement relative to the car between an open position and a closed position, a landing door, means mounting the landing door at a landing level for movement from an open position to a closed position, releasable coupling mechanism for coupling the landing door to the car door for movement therewith, said coupling mechanism comprising a coupling element associated with the landing door, a coupling member for engaging the coupling element and means mounting the coupling member on said car for movement from a retracted position to an extended position engaging the coupling element when the car door is adjacent said landing door, a lever pivotally mounted on the landing door, said lever having an actuating part in the path of the coupling member when the coupling member is in extended position, and locking means responsive to movement of the lever for locking the landing door in closed position.

5. A lift system as claimed in claim 4 wherein the coupling member has ramps positioned to engage the lever as the lift car approaches said landing door with the coupling member in extended position.

SERAPHIM KRUGER.

REFERENCES CITED

The following references are of record in the file of this patent:

UNITED STATES PATENTS

| Number | Name | Date |
|---|---|---|
| 740,569 | Jenkins | Oct. 6, 1903 |
| 1,579,754 | Cavanah | Apr. 6, 1926 |
| 1,876,438 | Werner | Sept. 6, 1932 |
| 1,892,420 | Brady | Dec. 27, 1932 |